United States Patent [19]

Hofbauer et al.

[11] 4,346,773
[45] Aug. 31, 1982

[54] APPARATUS FOR OPERATING A MOTOR VEHICLE

[75] Inventors: Peter Hofbauer; Karsten Ehlers; Paulus Heidemeyer, all of Wolfsburg, Fed. Rep. of Germany

[73] Assignee: Volkswagenwerk Aktiengesellschaft, Wolfsburg, Fed. Rep. of Germany

[21] Appl. No.: 159,836

[22] Filed: Jun. 16, 1980

[30] Foreign Application Priority Data

Jun. 26, 1979 [DE] Fed. Rep. of Germany ....... 2925675

[51] Int. Cl.³ .............................................. B60K 9/04
[52] U.S. Cl. .................................... 180/165; 74/572; 180/65 C; 310/74
[58] Field of Search ............... 180/165, 65 C; 310/74, 310/153, 158, 113, 112; 74/572

[56] References Cited

U.S. PATENT DOCUMENTS

| 2,393,010 | 1/1946 | Arnold et al. | 192/88 A |
|---|---|---|---|
| 2,502,798 | 4/1950 | Nabstedt et al. | 192/91 A |
| 2,589,453 | 3/1952 | Storsand | 180/165 X |
| 2,873,395 | 2/1959 | Kober | 310/112 |
| 2,935,899 | 5/1960 | Nallinger | 74/730 |
| 3,629,632 | 12/1971 | Loupe | 310/74 |
| 3,652,883 | 3/1972 | Cone | 310/74 |
| 3,734,222 | 5/1973 | Bardwick | 180/165 |
| 3,771,311 | 11/1973 | Herbst | 60/7 |
| 3,870,116 | 3/1975 | Seliber | 180/165 |
| 3,882,950 | 5/1975 | Strohlein | 180/54 R |
| 3,886,810 | 6/1975 | Sugiyama et al. | 74/751 |
| 4,095,922 | 6/1978 | Farr | 310/153 X |
| 4,131,185 | 12/1978 | Schall | 192/53 B |

FOREIGN PATENT DOCUMENTS

| 183996 | 4/1955 | Austria . |
|---|---|---|
| 229233 | of 0000 | Fed. Rep. of Germany . |
| 646581 | 6/1937 | Fed. Rep. of Germany . |
| 719124 | of 0000 | Fed. Rep. of Germany . |
| 912881 | 6/1954 | Fed. Rep. of Germany . |
| 1494128 | 12/1977 | United Kingdom . |
| 2006702 | 5/1979 | United Kingdom . |

Primary Examiner—Richard A. Bertsch
Assistant Examiner—Michael Mar
Attorney, Agent, or Firm—Brumbaugh, Graves, Donohue & Raymond

[57] ABSTRACT

An improved internal combustion engine arrangement for providing increased fuel efficiency, reduced pollution, and an improved starter and generator arrangement. An internal combustion engine having a flywheel for equalizing non-uniformities of engine output torque has a first conventional clutch for shifting gears, and a second controllable clutch between the flywheel and engine for selectively disconnecting and stopping the engine during certain operating states of the vehicle. A combined starter-generator is provided having a toothed, windingless rotor fixed on the flywheel periphery and a stator surrounding the rotor and provided with windings both for generating current, and for imparting rotational force on the flywheel, which in turn starts the engine.

3 Claims, 1 Drawing Figure

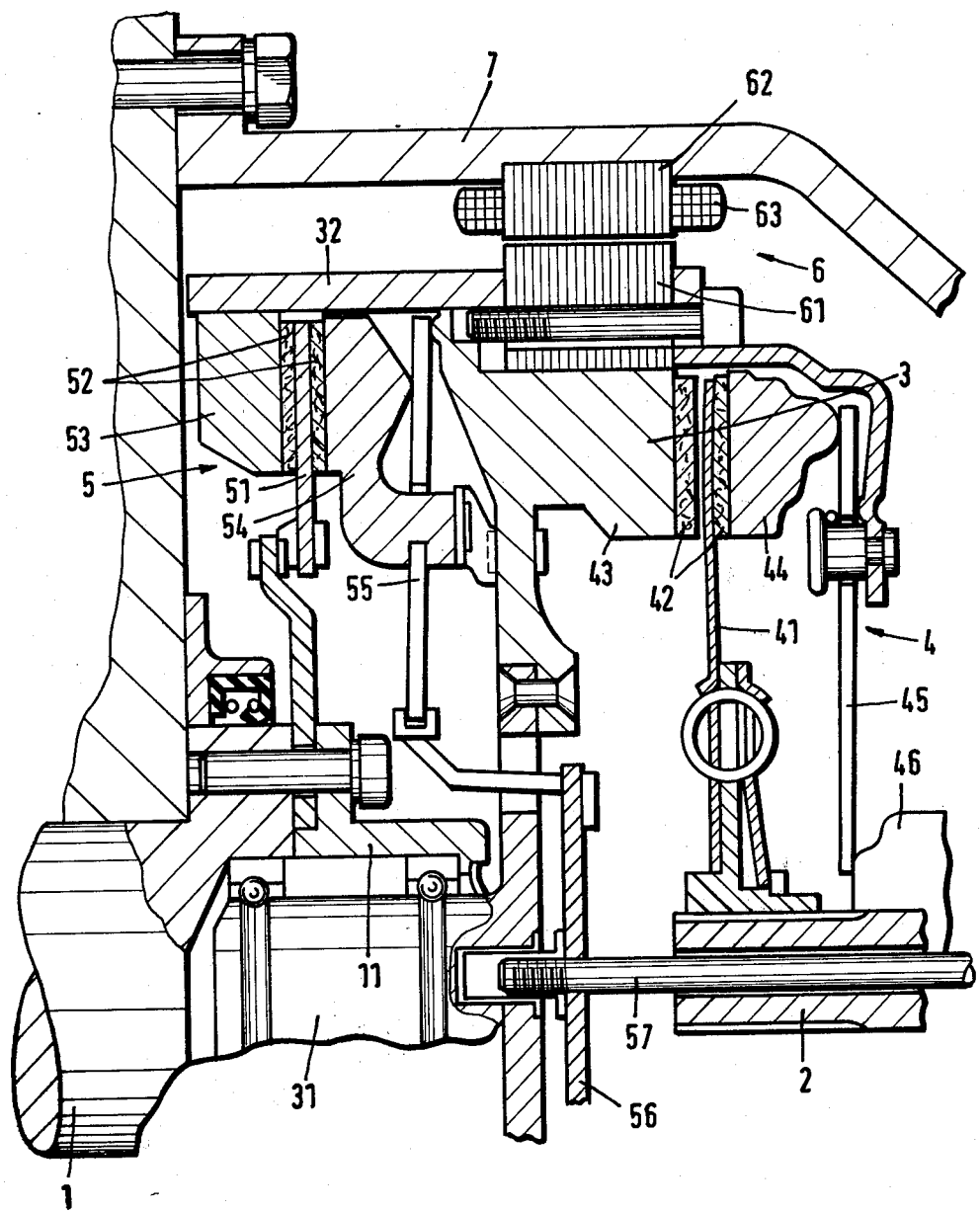

APPARATUS FOR OPERATING A MOTOR VEHICLE

BACKGROUND OF THE INVENTION

The invention relates to a motor vehicle having an internal combustion engine, a transmission, and a conventional flywheel, and which in addition to the customary clutch between the flywheel and transmission, has a second, controllable clutch between the engine and flywheel. A motor vehicle of this type is disclosed in U.S. application Ser. No. 955,186, filed Oct. 27, 1978 now U.S. Pat. No. 4,252,208. By selective actuation of the second clutch, the engine can be disconnected from the drive train and stopped during periods of vehicle travel when the engine is not required to power the vehicle. The flywheel is normally provided for equalizing the non-uniformities of engine torque, and when disconnected from the engine the engine stalls. During such operating states when the engine is stopped, kinetic energy is stored in the flywheel and is used to restart the engine when desired.

By way of example, the engine and flywheel may be disconnected and the engine stopped when the vehicle is deaccelerating or idling, as long as the flywheel rotates above a minimum rpm. When the number of rotations of the flywheel tends to fall below the minimum rpm, or the engine is required again to accelerate the vehicle, the connection between the motor and flywheel is automatically restored, and the stored kinetic energy in the flywheel rotates the engine crankshaft causing the engine to restart. The periodic stoppage of the engine, during operating states when not required, results both in decreased per mile fuel consumption of the vehicle, and lower per mile emissions.

The present invention also relates to an improved starter and generator arrangement for an internal combustion engine.

In conventional motor vehicles, the generator is spacially and functionally separate from the starter motor of the engine. The generator is normally connected to a rotating shaft of the engine by a V-belt to be run off the engine. On the other hand, due to the high start-up torque necessary to turn over the engine, the starter motor is normally arranged to engage directly the engine, e.g. by a gear arrangement, during start-up. German Pat. No. 932,334, however, discloses a starting device in which the starting motor and engine generator have been combined. The rotor of the combined starter and generator is provided with an electrical winding and supported rotatably on an extension of the engine crankshaft by anti-friction bearings. The cooperating stator surrounds the rotor and is fixed on a cylindrical prolongation of the engine housing surrounding the crankshaft extension. The rotor and stator assembly is enclosed in a dish-shaped inertial clutch assembly including an inertia flywheel attached to the rotor and a clutch element positively connected with the rotor and engaging the inertia flywheel.

It has also been proposed to use a starting motor with a windingless rotor in an internal combustion engine, as, for example, shown in German Auslegeschrift No. 21 23 831. The rotor is provided in the form of a rim attached to the flywheel. As in the case of the apparatus disclosed in German Pat. No. 932,334, in the starter motor arrangement provision must be made to deliver the high start-up torque needed to rotate the entire crankshaft mechanism of the engine. In addition, the starter motor of the German Auslegeschrift No. 21 23 831 must, during cranking, drive the customary generator (coupled separately to the engine).

SUMMARY OF THE INVENTION

The present invention is an apparatus for operating a motor vehicle in which the engine may be periodically stopped during certain operating states of the vehicle, and which provides a novel arrangement for starting the engine and for generating current for the electrical needs of the vehicle. A combination starting motor arrangement and generator cooperates with the engine during both initial starting and various running modes of the vehicle and engine.

More particularly, in accordance with the invention a motor vehicle has an internal combustion engine, a transmission, and a flywheel arranged between the engine and transmission for equalizing the non-uniformities of engine output torque. The customary first clutch is provided between the flywheel and transmission for shifting gears, and a second controllable clutch is arranged between the engine and flywheel. The second clutch is controlled to automatically interrupt the coupling between the engine and flywheel as a function of engine operating parameters.

In place of the conventional starter motor and the conventional generator, each normally separately connected with the engine, a combined generator-starter motor arrangement cooperates with the flywheel and clutches to provide a novel starting mechanism that does not, like conventional starting motors, act directly on the engine. The combined generator-starter has a rotor rigidly connected with the flywheel for rotation therewith and a stator rigidly connected with the clutch housing. The rotor is toothed, without electrical windings, and is arranged on the periphery of the flywheel in the form of a rim. The stator has a direct current supplied exciter current winding, a generator winding (for producing current), and a motor winding (for rotating the flywheel).

As noted above, the generator which normally is spacially and functionally separate from the electric starter is combined in the present invention with the starter so as to form one structural unit. Moreover, the combined generator and starter is built into and operates in conjunction with the flywheel arrangement for starting and stopping the motor. The rotor, forming part of the flywheel mass, is toothed and windingless. The stator accommodates windings for producing current, for example three-phase AC current windings, in order to function as a generator, and also incorporates windings which, when supplied with current, cause the rotor-stator to act as a motor to rotate the flywheel, e.g. when starting the engine.

Due to the fact that in the present invention the starter-generator assembly is combined with the flywheel, and the rotor contributes to the total flywheel mass, the overall arrangement is especially favorable with respect to space and weight requirements. In addition due to the rotor arrangement, mechanical transfer elements, such as toothed gears, frictional or V-belt drives otherwise needed when a separate starter motor and generator are present, as well as the associated shafts and bearings, can be dispensed with.

As a result, frictional losses in the engine are reduced, and engine efficiency is correspondingly increased; overall engine size is reduced; noises occurring when conventional starters are employed are substantially reduced; due to the windingless rotor, and the corresponding absence of sliding contacts and brushes, frictional loss are further reduced. In addition, in accordance with the present invention, force imparted to the flywheel by the starter-generator assembly for rotating the flywheel is applied at the flywheel periphery. As a result, the moment of inertia of the generator, that is, the $mr^2$ of the rotor, is not driven at the engine end face by the crank mechanism, and the second controllable clutch does not have to be used to transmit (from the engine) the force for building up flywheel speed. Such provides an advantage when the engine is started cold since the starting mechanism does not have to drive both the engine and flywheel, and in addition enables a more spontaneous reaction when the flywheel clutch engages the engine. Also, the absence of a V-belt drive for the generator, normally provided at the forward end of the engine, reduces axial space requirement of the engine assembly.

Due to the structural integration of a starter-generator and flywheel, a speed increase of the electrical generating machine relative to the speed of the engine crankshaft is no longer necessary (as in the case of conventional generators). This is a consequence of the peripheral arrangement of the rotor on the flywheel which provides an increased diameter of rotation in comparison with that of conventional generators. The resultant increase in peripheral speed of the rotor produces increased pole changing velocity so that the reduced rotational speed of the electrical generating machine is compensated for by the enlarged outer diameter.

The reduced rotational force-generating capacity inherent in a windingless rotor, which normally means that as a starting motor the rotor in the present invention can deliver only a small torque relative to conventinal starting motors, is likewise compensated for by the larger diameter of the rotor, producing in effect a correspondingly larger lever arm on the flywheel. Additionally, since in the present invention starting is accomplished without the need for the starting motor directly to turn over the engine, other normally existing transmission losses are not present when the starting motor phase is actuated, and only a comparatively small moment is required for running up to speed the unclutched flywheel (since the crank mechanism is not engaged).

It is preferable that the spaces between the teeth of the rotor are filled with non-magnetic substances, preferably with non-magnetic substances having a high specific gravity. Accordingly, the mass of the flywheel is further increased, and the incorporation of such substances smooths out the motor periphery to reduce the air resistance of the rotating rotor.

With the present arrangement, it becomes possible to provide not only initial starting for the flywheel and consequently the engine, and to generate electricity (both when the engine is running and while off, as long as the flywheel is spinning), but also the starting generator arrangement may be utilized during operation of the motor vehicle, at such times the engine is off, to maintain a flywheel rpm sufficient to re-start the engine. For, example, while the engine is off, flywheel rpm will decrease due to frictional losses in the flywheel bearings and may fall below that necessary to restart the engine. In accordance with the present invention, rather than having to restart the engine at such time as the flywheel rpm reaches the minimum at which it can restart the engine (i.e. such that the engine is used to increase the flywheel speed), the engine may remain off and the generator-starter arrangement used to maintain the minimum flywheel rpm needed to later restart the the engine. Accordingly, further fuel savings and reduced emissions are achieved.

The present invention provides an apparatus using a windingless rotor, but unlike the device shown in the aforementioned German Auslegeschrift No. 21 23 831, does not have to be designed as a high power and large space-occupying element, since not only is it incorporated with the first and second clutch elements, but eliminates the need for providing a separate starting motor and a separate generator.

For a better understanding of the invention, reference is made to the following detailed description of a preferred embodiment of the invention taken in conjunction with the accompanying drawing.

BRIEF DESCRIPTION OF THE DRAWING

The FIGURE represents a schematic sectional view of an engine in accordance with the present invention.

DETAILED DESCRIPTION OF A PREFERRED EMBODIMENT

An internal combustion engine has a crankshaft 1, which is connected to the transmission input shaft 2 of a mechanical transmission. A flywheel 3 is arranged between the engine output shaft 1 and transmission input shaft 2 in order to equalize the non-uniformities of engine output torque. A first, conventional clutch 4, shown as a spring disc clutch, is arranged between the transmission input shaft 2 and the flywheel 3, which permits the shifting of the transmission gears, in the customary manner by interrupting the force transmission of the power train.

The first clutch 4 includes frictional linings 42 which bear on a clutch plate 41. The clutch linings 42 cooperate with a first pressure plate 43 which is part of the flywheel 3 and with a second pressure plate 44. The clutch spring, in the form of a disc spring 45 and an associated conventional disengagement bearing 46 act on the second pressure plate 44.

As described in application Ser. No. 955,186, a second controllable clutch 5 is arranged between the crankshaft 1 and the flywheel 3 which may also be a spring disc clutch. The second controllable clutch operates as a function of the operating state of the motor vehicle and is automatically engaged and disengaged by electrical, pneumatic, or hydraulic controls, not shown, which act on a rod 57 (described below). The second controllable clutch 5, which interrupts the coupling between the driving engine and flywheel 3 during certain operating states of the vehicle, includes a clutch plate 51 connected through hub body 11 to the crankshaft 1. The elements may be connected by fixing screws or other suitable means.

First 53 and second 54 pressure plates are disposed on either side of the clutch plate 51, and act through clutch linings 52 on the clutch plate 51. The first pressure plate 53 is supported on the bell-like extension 32, for example by screws. The second pressure plate 54 is acted on by a clutch spring 55, which as shown may be a spring disc. The radially inner edge of the spring disc 55 is connected via a tension plate 56 with a tension rod 57 which extends concentrically through a center bore of the transmission input shaft 2. The tension rod 57 may be acted on at its end removed from the clutch 5 by the actuating control of the second controllable clutch, not shown. The tension rod 57 carries the tension plate 56, and is supported and axially displaceable in the flywheel 3. As shown in the FIGURE, the flywheel 3 has a centered bearing pin 31 which projects into the hub body 11 of the crankshaft 1 and is supported in the crankshaft 1 by anti-friction bearings.

A combined starter-generator 6 is provided within the clutch housing 7 which fulfills the functions of both the generator and starter of the engine. The starter-generator 6 is provided with a windingless, toothed rotor 61 in the manner of a heteropolar machine. The rotor 61 of the generator 6 is rigidly connected with the rotating flywheel 3. A stator 62 of the generator 6 is rigidly connected with the stationary clutch housing 7. In order to avoid eddy current losses, both the rotor 61 and the stator 62 are designed as lamellar stacks.

As in the case of the attachment of the first pressure plate 53 to the support extension 32, the rotor 61 may also be connected with the flywheel 3 by a screw arrangement in such a manner that the rotor 61 surrounds the periphery of the flywheel 3 in the form of a rim.

The stator 62 carries an exciter current winding supplied by direct current (for imparting initial motion to the stationary flywheel 3), a generator winding, and a motor winding (i.e. to permit the rotor-stator to act as a driving motor on the flywheel for increasing the flywheel rpm). The windings are shown in diagramatical form and are indicated as 63. The rotor 61 forms an integral component of the flywheel 3 and adds to the overall flywheel mass. Due to the rim-like arrangement, the rotor diameter is relatively large so that during engine operation, where rotational forces are induced in the rotor 61 by the motor winding of the stator 62 to drive the flywheel 3, a relatively large torque or lever arm is effected. Rotating slip rings are not required since the rotor contains no windings, and the corresponding mechanical losses will not occur. Accordingly, the provision of the rotor 61 on the flywheel periphery is not detrimental to the energy-storing function of the flywheel 3. Moreover, not only is a large torque arm provided which reduces the force needed to rotate the flywheel 3, but since the flywheel 3 can be run up to speed gradually (as opposed to convention starter motors which must rotate the entire engine quickly up to starting speed), current drain on the vehicle battery is further reduced. Also, as noted before the large rotor diameter is advantageous for generating current, since even at relatively low flywheel rpm the rotor speed would be substantial.

In the preferred spatial arrangement of the combined starting mechanism and current generating mechanism, no axial extension of the space in the clutch region is required, although some radial enlargement may occur. Depending upon starting torque and current generating requirements, the stator of the combined running and starting generator, designed as a heteropolar machine, need not extend around the entire circumference of the electric machine, and as such, depending upon the particular needs and space requirements, the starter may cover a peripheral angle of less than 360°. As a result, any increase in radial dimensions may be controlled.

When it is desired to drive the flywheel, for example when the starter-generator is used to rotate the flywheel 3 in order to run it up to operational speed, a rotating magnetic field is generated in the stator 62. Such rotating magnetic fields are customarily generated by providing the motor winding, which may for example be an AC three phase current winding, with three-phase current from the vehicle battery, for example through a convertor. Transistor or thyristor convertors, which are available on a plurality of designs, may be used for such purposes.

The invention has been described with reference to a preferred embodiment thereof. Variations and modifications of the invention will be apparent to persons skilled in the art without departing from the inventive concepts disclosed herein. All such modifications and variations are intended to be within the scope of the present invention as defined in the following claims.

We claim:

1. In a motor vehicle having an internal combustion engine for driving said vehicle, a transmission, a normally present, conventional flywheel means coupled between said engine and said transmission for equalizing the non-uniformities of engine output torque, first clutch means arranged between said flywheel means and said transmission for permitting shifting of transmission gears, a second, controllable clutch means arranged between said engine and said flywheel means for automatically interrupting the coupling between said engine and said flywheel means and for re-coupling said flywheel means to said engine as a function of engine operating conditions, wherein said first and second clutch means comprise a clutch housing; the improvement comprising: starter-generator means having rotor means rigidly connected with said flywheel means for rotation therewith and stator means rigidly connected with said clutch housing, wherein said rotor means comprises a toothed, windingless rotor arranged on the periphery of said flywheel means in the form of a rim, and wherein said stator means comprises a direct current exciter current winding, a generator winding and a motor winding.

2. A motor vehicle as defined in claim 1, wherein the spaces between the teeth of said rotor are filled with a non-magnetic substance.

3. A motor vehicle as defined in claim 2, wherein said non-magnetic substance has a high specific gravity.

* * * * *